United States Patent

[11] 3,611,354

[72] Inventors Bernard M. Gordon
Magnolia;
Leopold Neumann, Lexington, both of Mass.

[21] Appl. No. 823,421
[22] Filed May 9, 1969
[45] Patented Oct. 5, 1971
[73] Assignee Gordon Engineering Company
Wakefield, Mass.

[54] SERIES-SHUNT SWITCHING PAIR, PARTICULARLY FOR SYNCHRO TO DIGITAL CONVERSION, DC OR AC ANALOG REFERENCE-MULTIPLYING OR PLURAL SYNCHRO-MULTIPLEXING
15 Claims, 4 Drawing Figs.

[52] U.S. Cl. .......... 340/347 AD, 340/347 SY
[51] Int. Cl. .......... H03k 13/02
[50] Field of Search .......... 340/347, 198

[56] References Cited

UNITED STATES PATENTS

| | | | |
|---|---|---|---|
| 3,295,125 | 12/1966 | Idelsohn | 340/347 |
| 3,480,947 | 11/1969 | Naydan | 340/347 |
| 3,493,960 | 2/1970 | Doyle | 340/347 |
| 3,516,084 | 6/1970 | Sacks | 340/347 |

*Primary Examiner*—Maynard R. Wilbur
*Assistant Examiner*—Jeremiah Glassman
*Attorney*—Morse, Altman & Oates

ABSTRACT: In a multiplexing converter of synchro data to digital form, a plurality of switching devices, associated control logic, and a single analog comparator are provided for specifying the octant in which the synchro shaft angle is located. In a device, particularly for converting synchro data to digital form, for multiplying a DC or AC analog reference signal or for multiplexing plural synchro signals, a series-shunt switching pair is provided for presenting a constant impedance to a driving source in order to eliminate transients reflected back to the driving source when a variable impedance is presented to the driving source.

INVENTORS
BERNARD M. GORDON
LEOPOLD NEUMANN
BY Morse, Altman & Oates
ATTORNEYS

INVENTORS
BERNARD M. GORDON
LEOPOLD NEUMANN

BY Morse, Altman & Oates
ATTORNEYS

SERIES-SHUNT SWITCHING PAIR, PARTICULARLY FOR SYNCHRO TO DIGITAL CONVERSION, DC OR AC ANALOG REFERENCE-MULTIPLYING OR PLURAL SYNCHRO-MULTIPLEXING

BACKGROUND AND SUMMARY

The present invention relates to converters of synchro data to digital form and particularly to converters in which DC or AC analog reference signals are processed by successive approximation or the like. The present invention relates particularly to a series-shunt switching pair technique for use in such a data form converter. This technique involves the signal processing of trigonometric functions, in a synchro data to digital form converter, in such a way as to determine with unusual convenience the octant in which the synchro shaft angle is located. In a synchro to digital converter, synchro voltages are applied to a Scott transformation unit and are presented as sine and cosine functions of a synchro shaft angle to analog representation demodulator. Each sine and cosine function is applied to its correlative analog demodulator and is presented as a varying DC signal to an analog comparator. The combination of a pair of analog demodulators and an analog comparator is provided for determining the polarity of the sine function, the polarity of the cosine function, and their relative magnitudes. This combination is required for each input synchro. The analog comparator output signals, representing sine and cosine functions, are applied to an analog to digital converter is such a way that the greater magnitude function serves as a reference signal. Since analog demodulators have a slow response time, such converters have suffered from slow conversion speed. Furthermore, since a pair of analog demodulators and an analog comparator are required for each input synchro, converters for multiplexing synchro data to digital form have been cumbersome and expensive. In a typical successive approximation converter, conversion is accomplished by switching, in a logically programmed sequence, a reference voltage with respect to a resistive divider network to provide for comparison between referenced signal increments and input data signal increments. Such a converter has suffered from switching transients which have been reflected back to a driving source as a result of a variable impedance presented to the driving source as switching occurs. Such transients constitute conversion errors.

A primary object of the present invention is to provide, in multiplexing synchro data to digital form converters, a novel technique of conversion, wherein a single analog comparator replaces a plurality of analog demodulators. The converter is characterized by a switching network for controlling signals representing sine and cosine functions, a logic network for controlling the state of each switching device in the switching network, a cosine polarity flip-flop for specifying cosine function polarity, a sine polarity flip-flop for specifying sine function polarity, a magnitude flip-flop for specifying sine and cosine function relative magnitude, and an analog comparator for controlling a state of each of the aforementioned flip-flops. The combination of switching network, logic network, cosine polarity flip-flop, sine polarity flip-flop, magnitude flip-flop and analog comparator is such as to provide a high speed synchro data to digital form converter, which is unusually compact and inexpensive.

Another object of the present invention is to provide, in converters and multiplexers employing switching devices, a novel series-shunt switching pair for presenting a constant impedance to the driving source during switching, whereby switching transients are avoided and conversion errors are minimized.

The invention accordingly comprises the apparatus possessing the construction, combination of elements, and arrangements of parts that are exemplified in the following detailed disclosure, the scope of which will be indicated in the appended claims.

BRIEF DESCRIPTION OF DRAWINGS

For a fuller understanding of the nature and objects of the present invention, reference should be had to the following detailed description taken in connection with the accompanying drawings wherein.

DETAILED DESCRIPTION

Figures 1, 4:
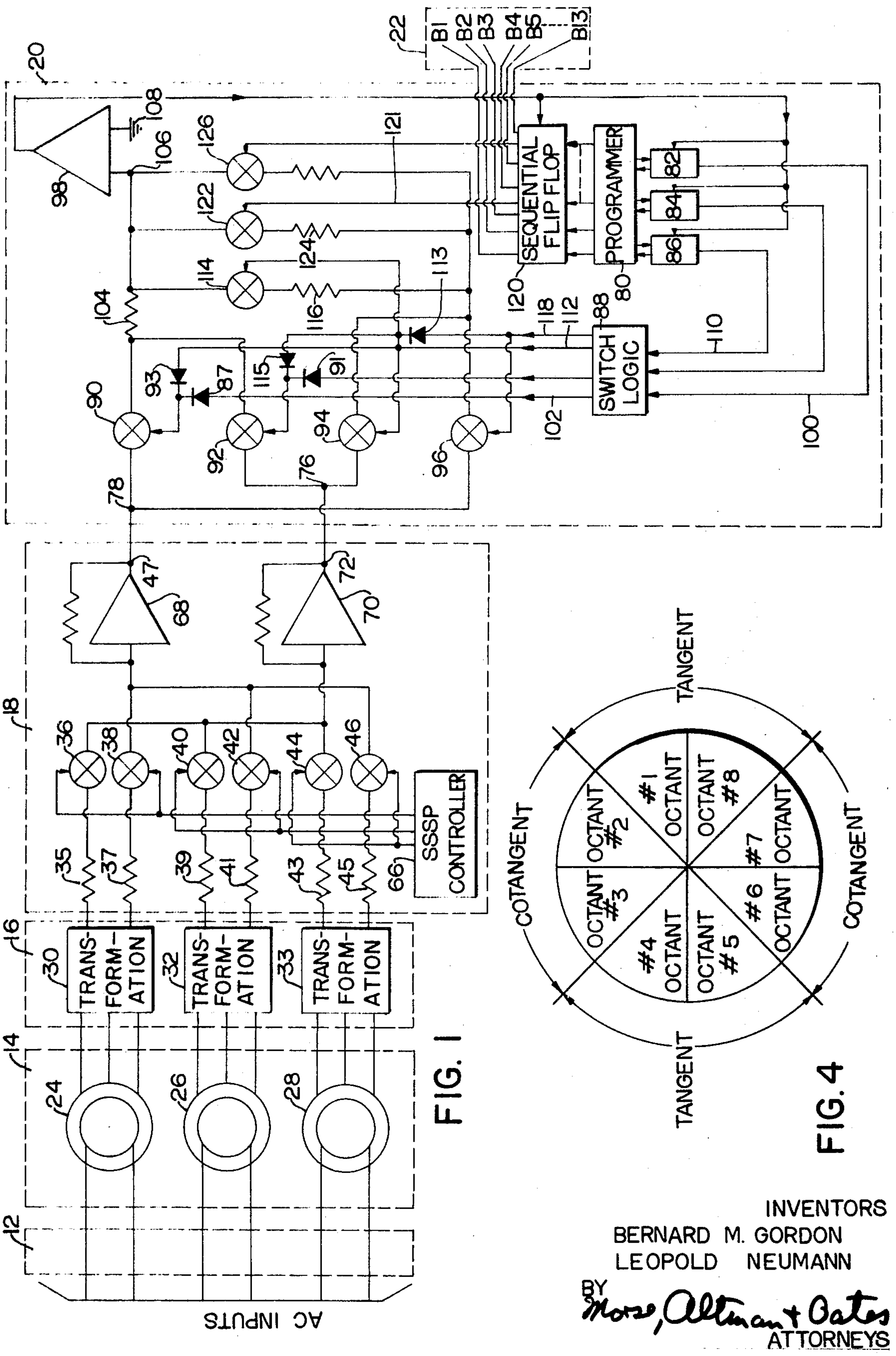
FIG. 1 is a block and schematic diagram of a synchro to digital converter embodying the present invention.
FIG. 4 is an angular representation of a conversion technique, particularly applicable to the converter of FIG. 1.

Generally, the synchro to digital system of FIG. 1 comprises a input terminal 12 for receiving a plurality of AC signals, a synchro network 14 for supplying a plurality of synchro shaft angle-related signals, a Scott transformation network 16 for supplying a plurality of trigonometric signals, for example, sine and cosine signals, a constant-impedance multiplex network 18 for supplying individual sine and cosine signals, an analog to digital converter 20 for converting the individual sine and cosine signals to digital form, and an output terminal 22 for presenting a digital signal representing the value of a synchro shaft angle.

In the device of FIG. 1, AC inputs from input network 12 are applied to synchros 24, 26 and 28 of synchro network 14. Stator voltages from synchros 24, 26 and 28 are applied to Scott transformation networks 30, 32 and 34, respectively. Each stator voltage amplitude is a function of the shaft position of its correlative synchro. It will be understood that, in alternative embodiments, the signals as at the input of the Scott transformation network are supplied by means other than the synchro network, for example, a resolver network. Scott transformation network output voltages, representing sine and cosine functions of synchro shaft position, for example, are applied to constant impedance multiplexer network 18. In the following discussion, for convenience, sine A and cosine A represent the output voltages of Scott transformation network 30, sine B and cosine B represent the output voltages of Scott transformation network 32, and sine C and cosine C represent the output voltages of Scott transformation network 34. Sine A, cosine A, sine B, cosine B, sine C and cosine C are applied to resistors 35, 37, 39, 41, 43 and 45, respectively. Resistors 35, 37, 39, 41, 43 and 45 are connected to series-shunt switching pairs 36, 38, 40, 42, 44 and 46, respectively.

Figure 3:
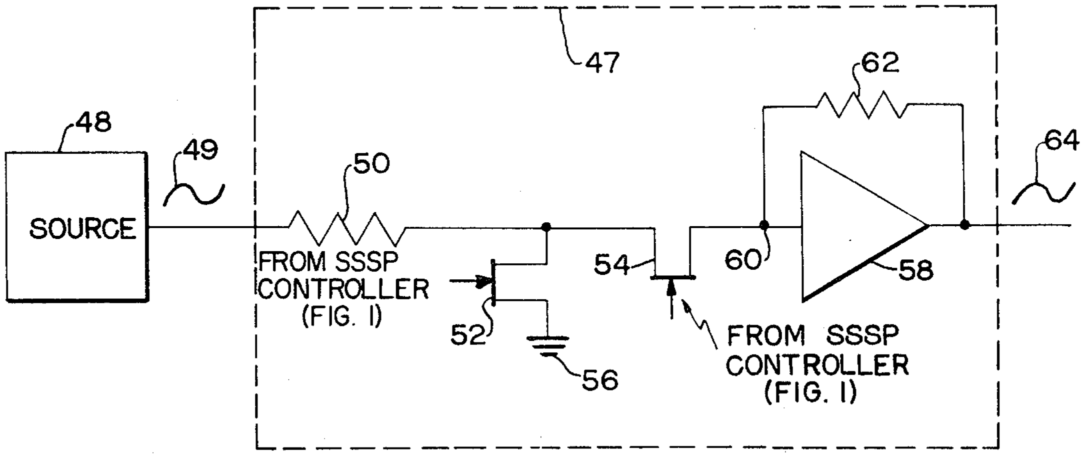
FIG. 3 is a schematic diagram of a series-shunt switching pair, particularly applicable to the converters of FIGS. 1 and 2.

A typical series-shunt switching pair, hereinafter referred to as an SSSP, is shown in FIG. 3 at 47. This SSSP represents a constant load to a driving source 48, such as a Scott transformation network. An output voltage 49 from driving source 48 generates a current in impedance 50, which is shown as being a resistor. A pair of field effect transistors 52 and 54 switch the current to a ground 56 or into a low impedance virtual ground at an input 60 of an operational amplifier 58. Field effect transistors 52 and 54 are shown as being controlled by an SSSP controller 66. A feedback resistor 62 across amplifier 58 reconverts the current to a voltage 64.

In FIG. 1, the outputs of SSSP's 36, 40, and 44 are applied to operational amplifier 70; and the outputs of SSSP's 38, 42, and 46 are applied to an operational amplifier 68. As previously stated, sine functions are the inputs of SSSP's 36, 40 and 44 and cosine functions are the inputs of SSSP's 38, 42 and 46. Therefore, the angular shaft positions of synchros 24, 26 and 28 are presented as sine functions at an output terminal 72 of operational amplifier 70 and as cosine functions at an output terminal 74 of operational amplifier 68. Output terminals 72 and 74 are connected to input terminal 76 and 78, respectively, of analog to digital converter 20.

In analog to digital converter 20, as illustrated, 13 comparisons are required for each complete conversion. It will be understood that, in alternative embodiments, the number of comparisons is other than 13, for example, 15. The first three comparisons are used to establish in which one of eight octants, shown in FIG. 4, the synchro shaft angle is located.

TABLE

| | Polarity | | Greater |
|---|---|---|---|
| Octant | Sine | Cosine | Magnitude |
| 01 | Positive | Positive | COSINE |
| 02 | Positive | Positive | Sine |
| 03 | Positive | Negative | SINE |
| 04 | Positive | Negative | COSINE |
| 05 | Positive | Negative | COSINE |
| 06 | Negative | Negative | SINE |
| 07 | Negative | Positive | SINE |
| 08 | Negative | Positive | COSINE |

The preceding table indicates that one octant is distinguished from any other octant by determining (a) the polarity of the cosine function, (b) the polarity of the sine function and (c) the relative magnitudes of these functions. For example, if the polarity of the sine function is positive, the polarity of the cosine function is positive and the magnitude of the cosine is greater than the magnitude of the sine, the synchro shaft angle is located in octant 01; if the polarity of the sine function is positive, the polarity of the cosine function is positive and the magnitude of the sine is greater than the magnitude of the cosine, the synchro shaft angle is located in octant 02.

A programmer 80, a cosine polarity flip-flop 82, a sine polarity flip-flop 84, a magnitude flip-flop 86, a switch logic 88 circuit, SSSP's 90, 92, 94 and 96, and a comparator 98 serve to determine the octant wherein the synchro shaft angle is located. Cosine polarity flip-flop 82 is triggered to a state ONE by a program pulse 01 from programmer 80. An output signal 100 from cosine flip-flop 82 is applied to switch logic circuit 88. SSSP 90 is energized to a conducting state by an output 102 from switch logic circuit 88 through a diode 87, whereby current flows through a resistor 104 to a summing bus 106 of comparator 98. When the current at 106 is negative with respect to a ground 108, a reject pulse is applied by comparator 98 to cosine polarity flip-flop 82, which is triggered to state ZERO. When the current at 106 is positive with respect to ground 108, an accept pulse is applied by comparator 98 to cosine polarity flip-flop 82, which remains in state ONE. In a similar manner, a program pulse 02, sine polarity flip-flop 84, switch logic 88, diode 91, SSSP 92 and comparator 98 serve to determine the polarity of the sine function. Magnitude flip-flop 86 is triggered to state ONE by a program pulse 03 from programmer 80. An output signal 110 from the magnitude flip-flop 86 is applied to switch logic 88. SSSP's 90, 94 and 114 are energized to the conducting state by an output 112 from logic switch 88, SSSP 90 is energized by the output 112 through a diode 93. The arrangement is such that currents then flow through resistors 116 and 104 to the summing bus 106 of comparator 98. When the current at 106 is negative with respect to ground 108, a reject pulse is applied by comparator 98 to magnitude flip-flop 86 in order to reset magnitude flip-flop 86 to state ZERO. SSSP's 90 and 94 are deenergized to the nonconducting state and SSSP's 92 and 96 are energized to the conducting state by an output pulse 118 from switch logic circuit 88 through diodes 113 and 115. When the current at 106 is positive with respect to ground 108, an accept pulse is generated from comparator 98 to magnitude flip-flop 86 so that SSSP's 90 and 94 are not deenergized. The remaining 10 comparisons serve to locate the synchro shaft angle within the octant established by the first three comparisons. The synchro angle shaft position is defined by either a tangent or a cotangent function. When the cosine function is larger than the sine function, the cosine function is used as a reference signal for converter 20. The signal at summing bus 106 is the sine function divided by the cosine function, which is equivalent to the tangent function of the synchro shaft angle. When the sine function is larger than the cosine function, the sine function is used as a reference signal for converter 20. The signal at summing bus 106 is the cosine function divided by the sine function, which is equivalent to the cotangent function of the synchro shaft angle.

A program pulse 04 is applied to a sequential flip-flop network which contains a plurality of sequential flip-flops (not shown). An output pulse 121 from sequential flip-flop network 120 is applied to SSSP 122. SSSP 122 is energized to a conducting state so that a current flows through a resistor 124. When the current at summing bus 106 is negative with respect to ground 108, a reject pulse is generated by comparator 98 so that SSSP 122 is deenergized to the nonconducting state. When the current at 106 is positive with respect to ground 108, a accept pulse is generated by comparator 98 so that SSSP 122 is not deenergized. The conversion is completed after a program pulse 013, for example, is applied to SSSP 126 and either a reject pulse or an accept pulse is generated by comparator 98. The final state of each sequential flip-flop in the sequential flip-flop network 120 represents one bit of the digital signal at output terminal 22, which delineates the synchro shaft position in digital form.

Figure 2:
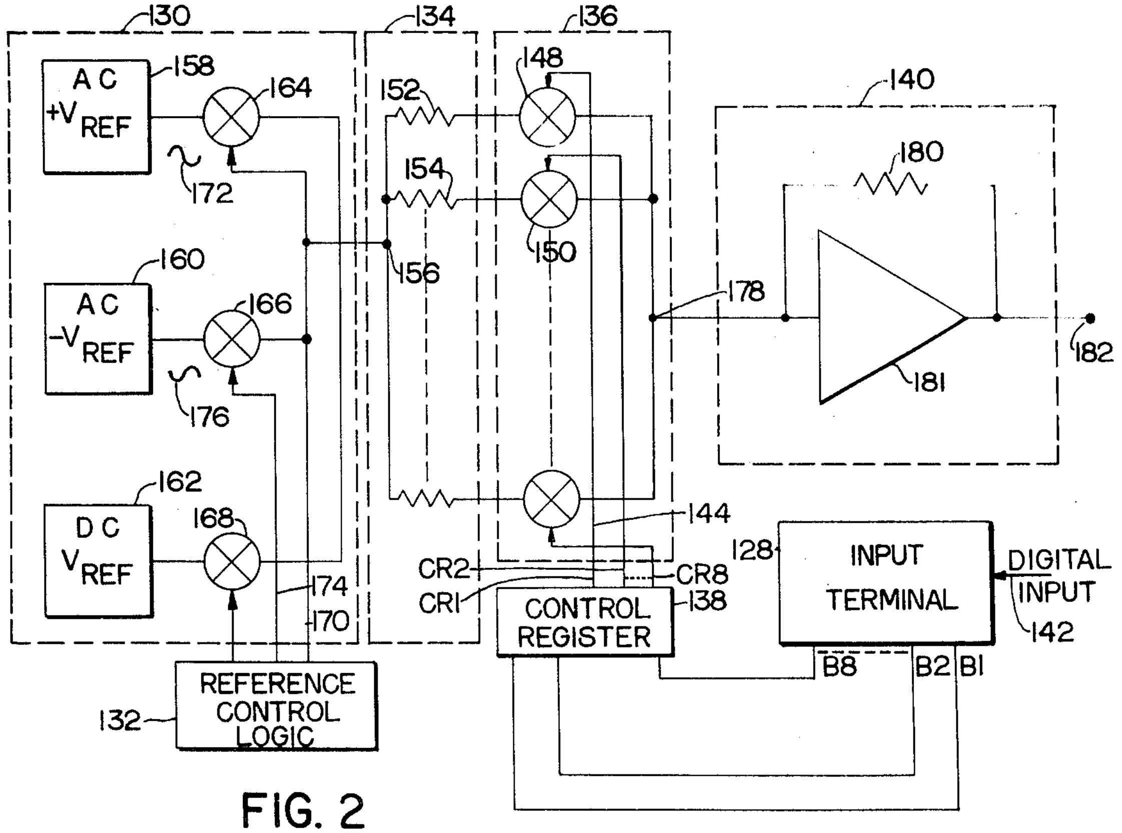
FIG. 2 is a block schematic diagram of a multiplying AC or DC analog reference converter embodying the present invention.

FIG. 2 illustrates an eight-bit-multiplying AC or DC reference digital to analog converter. Generally, the converter comprises an input terminal 128 for receiving a digital signal, a voltage source 130 for supplying a reference voltage, a reference control logic 132 for controlling the reference voltage, a sampling network 134 comprising a sequence of precision voltage components, for example, resistors, a switching network 136 comprising a plurality of SSSP switches for controlling current flow through the precision voltage components, a control register 138 for controlling the conduction state of the SSSP switches, and an amplifier network 140 for presenting the digital signal in analog form. In the illustrated converter, the sampling network includes eight SSSP switches. It will be understood that, in alternative embodiments, the number of SSSP switches is other than eight, for example, 12.

In the device of FIG. 2, a digital signal is applied at 142 to input terminal 128. The digital signal from the input terminal 128 is applied to control register 138. Each output signal from control register 138 is determined by the digital bit applied thereto, i.e., a signal CR1 at 144 is ONE if digital bit B1 at 146 case is ONE and signal CR1 is ZERO if digital bit B1 is ZERO. Associated with and controlled by each output of the control register is an SSSP. Output CR1 controls SSSP 148, output CR2 controls SSSP 150, etc. An SSSP is designated as being in the conducting stage when its correlative control register output signal is ONE and is designated as being in the nonconducting state when its correlative control register output signal is ZERO. Each SSSP is connected to one of the precision resistors in sampling network 134. Thus SSSP 148 is connected to precision resistor 152, SSSP 150 is connected to precision resistor 154, etc. A predetermined voltage from the voltage source 132 is applied to a junction 156, the union of the precision resistors in sampling network 134.

The predetermined voltage from the voltage source is generated from either a positive AC reference voltage supply 158, a negative AC reference voltage supply 160 or a DC reference voltage supply 162. Reference voltage supplies 158, 160 and 162 are connected to SSSP's 164, 166 and 168, respectively. Each of SSSP switches 164, 166 and 168 is controlled by reference control logic 132. When a positive AC reference voltage is required, a signal 170 from the reference control logic is applied to SSSP 164. Next SSSP 164 is energized to the conducting state and a positive AC reference voltage 172 is applied to junction 156. When a negative AC reference voltage is required, a signal 174 for the reference control logic circuit is applied to SSSP 166. Then SSSP 166 is energized to the conducting state and a negative AC reference voltage 176 is applied to junction 156. When an SSSP in the switching network is in the conducting state, a predetermined current is permitted to flow from junction 156 through the corresponding precision resistors to junction 178.

The value of each precision resistor is so weighted that the current through each contributes to a current at junction 178. The current at 178 generates a voltage across a feedback resistor 180 of amplifier 181. Hence, the voltage at output 182 is proportional to the current at junction 178. As previously stated, the current at 178 is dependent upon the conducting state of the SSSP switches in sampling network 136. Therefore, the voltage at output 182 represents the digital signal multiplied by the reference voltage at 156 in analog form.

Since certain changes may be made in the foregoing disclosure without departing from the scope of the invention herein involved, it is intended that all matter contained in the above description and shown in the accompanying drawings be construed in an illustrative and not in a limiting sense.

We claim:

1. A device for conversion of synchro data form to digital data form, said device comprising:

a. a plurality of synchro means for providing a plurality of synchro shaft angle related signals;

b. transformation means for providing a plurality of trigonometric signals, said trigonometric signals being related to said synchro shaft angle related signals;

c. constant impedance multiplex means for presenting a constant impedance load to said transformation means and a pair of said trigonometric signals representing said synchro shaft angle related signals of each said synchro means, said constant impedance multiplex means including a plurality of series-shunt switching means and amplifier means having a virtual ground at an input terminal thereof, each said series-shunt switching means having first and second switch means, said first switch means serially connected between said transformation means and virtual ground, said second switch means connected between ground and the junction of said first switch means and transformation means;

d. first polarity means for determining the polarity of a first trigonometric signal of said pair of trigonometric signals;

e. second polarity means for determining the polarity of a second trigonometric signal of said pair of trigonometric signals;

f. magnitude means for determining the relative magnitude of said first trigonometric signal to said second trigonometric signal;

g. analog to digital converter means for converting said trigonometric signals to digital signals; and h. output means connected to said analog to digital converter means for presenting said digital signals, said digital signals representing synchro data in digital form.

2. The device of claim 1, wherein said constant impedance multiplex means includes controller means for controlling the switching states of said first and second switch means in said plurality of said series-shunt switching pair means.

3. A device for conversion of synchro data form to digital data form, said device comprising:

a. a plurality of synchro means for providing a plurality of synchro shaft angle related signals;

b. transformation means for providing a plurality of trigonometric signals, said trigonometric signals being related to said synchro shaft angle related signals;

c. constant impedance multiplex means for presenting a constant impedance load to said transformation means and a pair of said trigonometric signals representing said synchro shaft angle related signals of each said synchro means;

d. first polarity means for determining the polarity of a first trigonometric signal of said pair of trigonometric signals;

e. second polarity means for determining the polarity of a second trigonometric signal of said pair of trigonometric signals;

f. magnitude means for determining the relative magnitude of said first trigonometric signal to said second trigonometric signal;

g. analog to digital converter means for converting said trigonometric signals to digital signals, said analog-to-digital converter means including:

i. a plurality of precision voltage component means through which currents are defined, said currents being related to said synchro shaft angle related signals;

ii. a sequence of series-shunt switching pair means for allowing said currents to flow through said voltage component means;

iii. sequential flip-flop means for controlling said sequence of series-shunt switching pair means;

iv. program means for sequentially triggering said sequential flip-flop means into a first state; and v. comparator means for comparing said currents to a ground potential; and h. output means connected to said digital-to-analog converter means for presenting said digital signals, said digital signals representing said synchro data in digital form.

4. The device of claim 3, wherein said comparator means includes:

a. accept means for generating accept pulses; and b. reject means for generating reject pulses for controlling a state of said first polarity means, said second polarity means and said magnitude means, and for triggering said sequential flip-flop means triggered into a first state by said programmer means into a second state, whereby a final state of said sequential flip-flop means represents a digital indication of said synchro data.

5. A device of conversion of synchro data form to digital data form, said device comprising:

a. synchro means for providing a plurality of amplitude related signals;

b. transformation means for providing a plurality of sine and cosine signals, said sine and cosine signals being related to said amplitude related signals;

c. constant impedance multiplex means for presenting a constant load to said transformation means and individual sine and cosine signals representing said amplitude related signals, said constant impedance multiplex means including a plurality of series-shunt switching means and amplifier means having a virtual ground at an input terminal thereof, each said series-shunt switching means having first and second switch means, said first switch means serially connected between said transformation means and virtual ground, said second switch means connected between ground and the junction of said first switch means and transformation means;

d. sine polarity means for determining the polarity of said sine signal;

e. cosine polarity means for determining the polarity of said cosine signal;

f. magnitude means for determining the relative magnitude of said sine signal to said cosine signal;

g. analog-to-digital converter means for converting said individual sine and cosine signals to digital signals; and h. output means connected to said analog-to-digital converter means for presenting said digital signal, said digital signals representing said synchro data in digital form.

6. The device of claim 5, wherein said constant impedance multiplex means includes controller means for controlling the switching states of said first and second switch means in said plurality of series-shunt switching pair means.

7. A device of conversion of synchro data form to digital data form, said device comprising:

a. synchro means for providing a plurality of amplitude related signals;

b. transformation means for providing a plurality of sine and cosine signals, said sine and cosine signals being related to said amplitude related signals;

c. constant impedance multiplex means for presenting a constant load to said transformation means and individual sine and cosine signals representing said amplitude related signals;
d. sine polarity means for determining the polarity of said sine signal;
e. cosine polarity means for determining the polarity of said cosine signal;
f. magnitude means for determining the relative magnitude of said sine signal to said cosine signal;
g. analog-to-digital converter means for converting said individual sine and cosine signals to digital signals, said analog-to-digital converter means including:
i. a pluralness of series-shunt switching pair means for applying either said sine or cosine signal as a reference signal to said analog-to-digital converter means, said reference signal being the greater magnitude of said sine or cosine signal, and for applying the lesser magnitude of said sine or cosine signal as an input signal; and
ii. switching logic means for controlling a state of said pluralness of series-shunt switching pair means, and
h. output means connected to said analog-to-digital converter for presenting said digital signals, said digital signals representing said synchro data in digital form.

8. A device for conversion of resolver data form to digital data form, said device comprising:
a. a plurality of resolver means for providing a plurality of resolver shaft angle related signals;
b. transformation means for providing a plurality of trigonometric signals, said trigonometric signals being related to said resolver shaft angle related signals;
c. constant impedance multiplex means for presenting a constant impedance load to said transformation means and a pair of said trigonometric signals representing said resolver shaft angle related signals of each of said resolver means, said constant impedance multiplex means including a plurality of series-shunt switching means and amplifier means having a virtual ground at an input terminal thereof, each said series-shunt switching means having first and second switch means, said first switch means serially connected between said transformation means and virtual ground, said second switch means connected between ground and the junction of said first switch means and transformation means;
d. first polarity means for determining the polarity of a first trigonometric signal of said pair of trigonometric signals;
e. second polarity means for determining the polarity of a second trigonometric signal of said pair of trigonometric signals;
f. magnitude means for determining the relative magnitude of said first trigonometric signal to said second trigonometric signal;
g. analog-to-digital converter means for converting said trigonometric signals to digital signals; and
h. output means connected to said analog-to-digital converter means for presenting said digital signals, said digital signals representing said resolver data in digital form.

9. A device for conversion of digital data form to analog data form, said device comprising:
a. input means for receiving a digital signal;
b. voltage source means for providing reference voltages;
c. a plurality of precision voltage component means through which currents are defined, said currents being related to said digital signal;
d. amplifier means having input and output terminals, said input terminal being a virtual ground;
e. a plurality of series-shunt switching pair means for allowing said currents to flow through said precision voltage component means, one each of said series-shunt switching pair means connected to one each of said precision voltage component means, each said series-shunt switching pair means having first and second switch means, said first switch means serially connected between said precision voltage component means and virtual ground, said second switch means connected between ground and the junction of said first switch means and precision voltage component means;
f. control register means for controlling said series-shunt switching pair means;
g. feedback means connected between the input and output terminal of said amplifier means for converting said current to a voltage; and
h. output means connected to the output terminal of said amplifier means for presenting the signal as at the output terminal of said amplifier means which represents said digital signals in analog form.

10. A device for conversion of digital data form to proportional analog data form, said device comprising:
a. input means for receiving a digital signal;
b. voltage source means for providing AC and DC reference voltages;
c. switching means for selecting either said AC or DC reference voltage from said voltage source means;
d. reference control logic means for controlling a state of said switching means;
e. a plurality of precision voltage component means through which currents are defined, said currents being related to said digital signal;
f. amplifier means having input and output terminals, said input terminal being a virtual ground;
g. a plurality of first series-shunt switching pair means for allowing said currents to flow through said precision voltage component means, one each of said first series-shunt switch pair means connected to one each of said precision voltage component means, each said first series-shunt switching pair means having first and second switch means, said first switch means serially connected between said precision voltage component means and virtual ground, said second switch means connected between ground and the junction of said first switch means and precision voltage component means;
h. control register means for controlling said series-shunt switching pair means;
i. feedback means connected between the input and output terminal of said amplifier means for converting said current to a voltage; and
j. output means connected to the output terminal of said amplifier means for presenting the signal as at the output terminal of said amplifier means which represents said digital signals in proportional analog form.

11. The device of claim 10 wherein said switching means comprises a plurality of second series-shunt switching pair means.

12. A device for conversion of trigonometric data form to digital data form, said device comprising:
a. input means for receiving a pair of trigonometric signals;
b. first polarity means for determining the polarity of a first trigonometric signal of said pair of trigonometric signals;
c. second polarity means for determining the polarity of a second trigonometric signal of said pair of trigonometric signals;
d. magnitude means for determining the relative magnitude of said first trigonometric signal to said second trigonometric signal;
e. analog-to-digital converter means for converting said trigonometric signals to digital signals;
f. a plurality of series-shunt switching pair means for applying either said first or second trigonometric signal as a reference signal to said analog to digital converter means, said reference signal being the greater magnitude of said first or second trigonometric signal, and for applying the lesser magnitude of said first or second trigonometric signal as an input signal, each of said series-shunt switching pair means including:
i. first switch means;
ii. second switch means; and iii. amplifier means having input and output terminals, said input terminal being a virtual ground, said output terminal being connected to said analog to digital converter means;
iv. said first switch means serially connected between said input means and said virtual ground, said second switch means connected between ground and the junction of said input means and first switch means;

g. switching logic means for controlling a state of said plurality of series-shunt switching pair means; and
h. output means connected to said analog to digital converter means for presenting said digital signals, said digital signals representing said trigonometric data in digital form.

13. A device for conversion of synchro data form to digital data form, said device comprising:

a. a plurality of synchro means for providing a plurality of synchro shaft angle related signals;
b. transformation means for providing a plurality of trigonometric signals, said trigonometric signals being related to said synchro shaft angle related signals;
c. constant impedance multiplex means for presenting a constant impedance load to said transformation means and a pair of said trigonometric signals representing said synchro shaft angle related signals of each said synchro means;
d. first polarity means for determining the polarity of a first trigonometric signal of said pair of trigonometric signals;
e. second polarity means for determining the polarity of a second trigonometric signal of said pair of trigonometric signals;
f. magnitude means for determining the relative magnitude of said first trigonometric signal to said second trigonometric signal;
g. analog-to-digital converter means for converting said trigonometric signals to digital signals;
h. a pluralness of series-shunt switching pair means for applying either said first or second trigonometric signal as a reference signal to said analog to digital converter means, said reference signal being the greater magnitude of said first or second trigonometric signal, and for applying the lesser magnitude of said first or second trigonometric signal as an input signal; and
i. switching logic means for controlling a state of said pluralness of series-shunt switching pair means; and
j. output means connected to said digital to analog converter for presenting said digital signals, said digital signals representing said synchro data in digital form.

14. A device of conversion of synchro data form to digital data form, said device comprising:

a. synchro means for providing a plurality of amplitude related signals;
b. transformation means for providing a plurality of sine and cosine signals, said sine and cosine signals being related to said amplitude related signals;
c. constant impedance multiplex means for presenting a constant load to said transformation means and individual sine and cosine signals representing said amplitude related signals;
d. sine polarity means for determining the polarity of said sine signal;
e. cosine polarity means for determining the polarity of said cosine signal;
f. magnitude means for determining the relative magnitude of said sine signal to said cosine signal;
g. analog to digital converter means for converting said individual sine and cosine signals to digital signals, said analog to digital converter means including:
   i. a plurality of precision voltage component means through which currents are defined, said currents being related to said amplitude related signals;
   ii. a sequence of series-shunt switching pair means for allowing said currents to flow through said voltage component means;
   iii. sequential flip-flop means for controlling said sequence of series-shunt switching pair means;
   iv. programmer means for sequentially triggering said sequential flip-flop means into a first state; and
   v. comparator means for comparing said currents to a ground potential; and
h. output means connected to said analog to digital converter for presenting said digital signals, said digital signals representing said synchro data in digital form.

15. The device of claim 14, wherein said comparator means includes:

a. accept means for generating accept pulses; and
b. reject means for generating reject pulses for controlling a state of said sine polarity means, said cosine polarity means and said magnitude means, and for triggering said sequential flip-flop means triggered into a first state by said programmer means into a second state, whereby a final state of said sequential flip-flop means represents a digital indication of said synchro data.